United States Patent
Dunshea et al.

(10) Patent No.: US 7,721,047 B2
(45) Date of Patent: May 18, 2010

(54) SYSTEM, METHOD AND COMPUTER PROGRAM PRODUCT FOR APPLICATION-LEVEL CACHE-MAPPING AWARENESS AND REALLOCATION REQUESTS

(75) Inventors: Andrew Dunshea, Austin, TX (US); Diane Garza Flemming, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 11/006,112

(22) Filed: Dec. 7, 2004

(65) Prior Publication Data

US 2006/0123196 A1 Jun. 8, 2006

(51) Int. Cl.
G06F 13/00 (2006.01)
G06F 13/28 (2006.01)

(52) U.S. Cl. .................... 711/118; 711/126; 711/165; 711/170

(58) Field of Classification Search ......... 711/117–146, 711/151, 158, 165, 170–172, 206, 188
See application file for complete search history.

(56) References Cited

U.S. PATENT DOCUMENTS

| | | | |
|---|---|---|---|
| 3,569,938 A * | 3/1971 | Eden et al. ..................... 711/3 |
| 4,511,964 A * | 4/1985 | Georg et al. ................. 711/202 |
| 5,590,300 A * | 12/1996 | Lautzenheiser ............. 711/202 |
| 5,604,882 A | 2/1997 | Hoover et al. |
| 5,651,136 A | 7/1997 | Denton et al. |
| 5,684,976 A * | 11/1997 | Soheili-Arasi et al. ...... 711/128 |
| 5,860,106 A * | 1/1999 | Domen et al. ............... 713/324 |
| 5,920,896 A | 7/1999 | Grimsrud et al. |
| 5,960,454 A * | 9/1999 | Mandal et al. .............. 711/118 |
| 6,047,319 A | 4/2000 | Olson |
| 6,079,863 A | 6/2000 | Furukawa et al. |
| 6,148,387 A | 11/2000 | Galasso et al. |
| 6,219,693 B1 * | 4/2001 | Napolitano et al. ......... 709/203 |
| 6,243,788 B1 * | 6/2001 | Franke et al. .................. 711/3 |

(Continued)

OTHER PUBLICATIONS

Jim Handy, the Cache Memory book: The authoritative reference on cache design, 1998, Academic Press Inc, p. 53.*

(Continued)

*Primary Examiner*—Shane M Thomas
*Assistant Examiner*—Christopher D Birkhimer
(74) *Attorney, Agent, or Firm*—Dillon & Yudell LLP (57) ABSTRACT

In view of the foregoing, the shortcomings of the prior art cache optimization techniques, the present invention provides an improved method, system, and computer program product that can optimize cache utilization. In one embodiment, an application requests a kernel cache map from a kernel service and the application receives the kernel. The application designs an optimum cache footprint for a data set from said application. The objects, advantages and features of the present invention will become apparent from the following detailed description. In one embodiment of the present invention, the application transmits a memory reallocation order to a memory manager. In one embodiment of the present invention, the step of the application transmitting a memory reallocation order to the memory manager further comprises the application transmitting a memory reallocation order containing the optimum cache footprint to the memory manager. In one embodiment of the present invention, the step of the application transmitting a memory reallocation order to a memory manager further comprises the application transmitting the memory reallocation order containing to a reallocation services tool within the memory manager.

18 Claims, 6 Drawing Sheets

U.S. PATENT DOCUMENTS

| | | | |
|---|---|---|---|
| 6,301,605 B1 * | 10/2001 | Napolitano et al. | 709/201 |
| 6,301,652 B1 | 10/2001 | Prosser et al. | |
| 6,366,994 B1 * | 4/2002 | Kalyur | 711/173 |
| 6,434,695 B1 * | 8/2002 | Esfahani et al. | 713/2 |
| 6,567,887 B2 * | 5/2003 | Harmer | 711/112 |
| 6,604,174 B1 * | 8/2003 | Dean et al. | 711/131 |
| 6,640,278 B1 * | 10/2003 | Nolan et al. | 711/6 |
| 6,640,284 B1 * | 10/2003 | Shaw et al. | 711/129 |
| 2002/0198956 A1 | 12/2002 | Dunshea et al. | |
| 2003/0101324 A1 * | 5/2003 | Herr et al. | 711/170 |
| 2004/0088498 A1 | 5/2004 | Accapadi et al. | |

OTHER PUBLICATIONS

"Instruction Placement Method to Improve Cache Behavior" IBM Confidential Technical Disclosure, Jun. 1994, 3 pages, vol. 37, Pub. No. 6A, https://www.delphion.com/tdbs/tdb?o=94A%2061887.

"Direct Access Storage Device Cache Segment Management" IBM Confidential Technical Disclosure, Aug. 1994, 6 pages, vol. 37, Pub. No. 8, https://www.delhion.com/tdbs/tdb?o=94A%2062677.

Jos Accapadi et al., "Method and Apparatus for Managing a Cache", U.S. Utility Patent Application, Filed Jun. 25, 2001, U.S. Appl. No. 90/888,468.

William Bodin et al., "System and Method for Preferred Memory Affinity", U.S. Utility Patent Application, Filed Oct. 31, 2002, U.S. Appl. No. 10/286,532.

P.J. Fleming, "File Access History Retention and Usage", IBM Confidential Disclosure, printed Jun. 15, 2004, 2 pages, Disclosure No. RO8900347.

"Ravenbrook: The Memory Management Reference", 2001, Ravenbrook Limited, pp. 7, 22-23; www.memorymanagement.org.

* cited by examiner

SYSTEM, METHOD AND COMPUTER PROGRAM PRODUCT FOR APPLICATION-LEVEL CACHE-MAPPING AWARENESS AND REALLOCATION REQUESTS

CROSS-REFERENCE TO RELATED APPLICATION

The present application is related to the following U.S. patent application filed on even date herewith, and incorporated herein by reference in its entirety:

Ser. No. 11/006,127, filed on Dec. 7, 2004, entitled "SYSTEM, METHOD AND COMPUTER PROGRAM PRODUCT FOR APPLICATION-LEVEL CACHE-MAPPING AWARENESS AND REALLOCATION".

BACKGROUND OF THE INVENTION

1. Technical Field

The present invention relates generally to data processing and more specifically to cache access mechanisms in data processing systems.

2. Description of the Related Art

A conventional multiprocessor data processing system may comprise a system bus to which a system memory and a number of processing units that may each include a processor and one or more levels of cache memory are coupled. Caches are temporary storage facilities utilized to store subsets of the overall memory of a data processing system at varying latencies. At the various levels of a cache hierarchy, a tradeoff is made between the size and the access latency of the cache at the given hierarchy level. The cache most directly coupled to a processing unit, typically referred to as the level one or "L1" cache, usually has the lowest latency but is the smallest of the various caches. Likewise, the cache at the lowest level of the hierarchy usually has a larger storage capacity, often one or two orders of magnitude larger that the L1 cache, but at a higher access latency.

It is often the case, though not required, that the cache at a lower level of the cache hierarchy contains a copy of all the data contained in the caches at higher levels of the cache hierarchy. This property is known as "inclusion" and necessarily leads to the condition that a cache at a lower level of the cache hierarchy be at least as large as the cache at the next higher level of the hierarchy in order to allow the lower level cache to include the contents of memory cached at the next higher level. Those skilled in the art are familiar with the notion of constructing a multi-level cache hierarchy that optimizes the access latency and size characteristics of the various cache hierarchy levels according to available implementation technologies, leading to optimal system performance.

A cache, at a given level of hierarchy, is typically comprised of a number of components often including a cache directory array, a cache data array, and those functional logic units necessary to update and manage the cache. The data array portion of a cache is a set of data storage elements utilized to store copies of portions of main memory. The data array is divided into a series of so called "cache blocks". These cache blocks are storage regions utilized to hold copies of contiguous portions of the main memory within the data processing system. These blocks are typically on the order of 128 bytes in size and are further arranged into groups, known as "sets", of usually 8 to 16 blocks. The overall data array contains of a number of these sets. When placing a portion of memory within the cache, some number of the bits of the address of the block of memory are typically utilized to index into the various cache sets to determine a set within which to place the block of memory. That is to say, each contiguous aligned portion of main memory within the data processing system maps to a particular set. Within the cache set, various allocation policies are utilized to pick which member among the members within the set to place the block. In summary, the data array is divided into multiple cache sets which contain multiple cache blocks. Any given block in memory is typically allocated to some selected block within a particular set chosen by a mapping function of some of the address bits corresponding to the address of the block in main memory.

The cache further typically includes a cache directory array. This array consists of bookkeeping information detailing which portions of the overall data processing system memory and their processing states that are currently present within the cache. Typically, each block within the cache data array also has a corresponding entry within the cache directory array detailing which portion of main memory and its processing state is present in that cache data block. Each directory entry usually includes a number of fields possibly including a TAG field, a STATE field, an LRU field, an INCLUSION field, and an ECC field, which provides error correction and detection.

The TAG field within the directory entry corresponds to those high order address bits necessary to determine which block within the main memory is present within the cache data array entry associated with this directory entry. The TAG field typically represents the majority of the bits within a cache directory entry. The STATE field typically indicates the processing state of the cache line. For example, this field is often used to maintain the cache coherence state of the cache block according to some cache coherence protocol such as the well known "MESI" protocol. The LRU field typically contains information about recent accesses to the cache line and is used to guide the cache block replacement policy when cache blocks of new addresses are allocated within the cache set. Finally, the inclusion field often indicates whether or not the current cache block is present in a higher level cache. Those skilled in the art will appreciate that the format and contents of the directory entry discussed here is but one representative format possible.

In order to allow for larger lower level caches without dramatically adding to cache directory array overhead, a technique known as "sectoring" is often employed. In sectoring, the cache blocks in a lower level cache often consist of a number of different "sectors". That is to say, in the lower level cache, the cache blocks as described above are further divided into two or more like-sized sub-regions. These sectors are typically equal in size to the cache block size of the cache immediately above the current cache in the cache hierarchy.

Furthermore, each of the sectors can typically be manipulated and managed individually. For example, one sector of a cache block could be present in the lower level cache and the other sector could be not present. To support independent processing of the various sectors, the directory entry is usually formatted to include STATE fields for each individual sector. Importantly, the single TAG field within the cache directory entry, which dominates the size of the cache directory entry, now corresponds to a larger cache block. In other words, a similar number of directory entries with additional STATE fields per sector can support a larger cache in the same cache directory area than would be possible with a non-sectored implementation that would require an additional TAG field for each sector.

Finally, the cache also contains functional logic queues that consist of the functional logic necessary to update the cache, provide data to higher level caches or the processing unit(s), and honor snooped requests from either the system interconnect or lower level caches. These functional queues are typically divided into two classes of queues: Read Queues and Snoop queues, which process requests from higher level caches or the processing unit(s) or from the system interconnect or lower level caches, respectively. As part of their function, these queues are responsible for updating the cache data and directory arrays.

The methods used today to optimize cache behavior include alignment and cache-line padding. Large pages can also be used to provide a uniform distribution in the cache. Each of these three approaches presents frustrating problems. Alignment in the cache, while providing object separation (e.g., two blocks separated on two cache lines to avoid conflicts), provides poor utilization of an available cache resource through large amounts of unused space. Similar issues exist with cache-line padding. Large pages provide better distribution, because real addresses within the large page sequentially map into congruence class sets. However, multiple large pages cause conflicts in the cache when large page mappings become identical. In addition, any application's access pattern may not be totally ideally suited to large pages (e.g., an application may benefit from interleaving objects within the cache).

SUMMARY OF THE INVENTION

In view of the foregoing, the shortcomings of the prior art cache optimization techniques, the present invention provides an improved method, system, and computer program product that can optimize cache utilization. In one embodiment, an application requests a kernel cache map from a kernel service and the application receives the kernel. The application designs an optimum cache footprint for a data set from said application. The objects, advantages and features of the present invention will become apparent from the following detailed description.

In one embodiment of the present invention, the application transmits a memory reallocation order to a memory manager.

In one embodiment of the present invention, the step of the application transmitting a memory reallocation order to the memory manager further comprises the application transmitting a memory reallocation order containing the optimum cache footprint to the memory manager.

In one embodiment of the present invention, the step of the application transmitting a memory reallocation order to a memory manager further comprises the application transmitting the memory reallocation order containing to a reallocation services tool within the memory manager.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
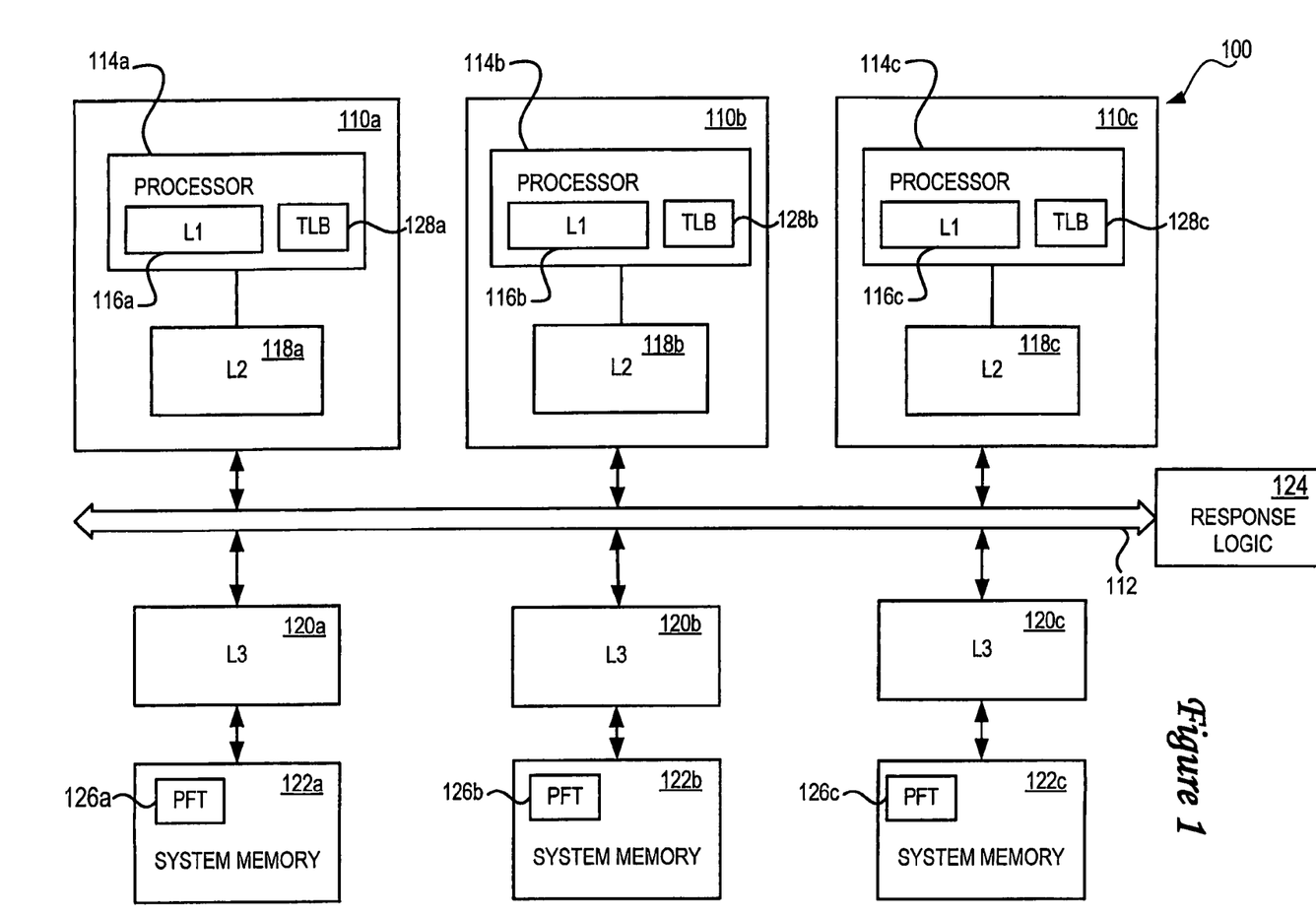
FIG. 1 depicts an illustrative embodiment of a multiprocessor data processing system with which the present invention may advantageously be utilized.

With reference now to the figures and in particular with reference to FIG. 1, there is illustrated a high level block diagram of a multiprocessor data processing system in accordance with the present invention. As depicted, data processing system 100 includes a number of processing units 110a-110c communicatively coupled to a system interconnect 112. Each of processing units 110a-110c is an integrated circuit including one or more processors 114a-114c. In addition to the registers, instruction flow logic and execution units utilized to execute program instructions, each of processors 114a-114c also includes an associated level one (L1) cache 116a-116c, which temporarily stores instructions and data that are likely to be accessed by the associated processors 114a-114c. Although L1 caches 116a-116c are illustrated in FIG. 1 as unified caches that store both instruction and data (both referred to hereinafter simply as data), those skilled in the art will appreciate that each of L1 caches 116a-116c could alternatively be implemented as bifurcated instruction and data caches.

As further illustrated in FIG. 1, the memory hierarchy of data processing system 100 also includes distributed system memories 122a-122c, which form the lowest level of volatile data storage in the memory hierarchy, and one or more lower levels of cache memory, such as on-chip level two (L2) caches 118a-118c and off-chip L3 caches 120a-120c, which are utilized to stage data from system memories 122a-122c to processors 114a-114c. Additionally, each of processors 114a-114c includes a translation lookaside buffer (TLB) 128a-128c for caching copies of entries from a distributed page frame table 126a-126c, which is distributed throughout system memories 122a-122c.

As understood by those skilled in the art, each succeeding lower level of the memory hierarchy is typically capable of storing a larger amount of data than higher levels, but at a higher access latency. For example, in an exemplary embodiment, L1 caches 116a-116c may each have 512 64-byte cache lines for a total storage capacity of 32 kilobytes (kB), all at single cycle latency. L2 caches 118a-118c may each have 2048 128-byte cache lines for a total storage capacity of 256 kB at approximately 10 cycle latency. L3 caches 120a-120c may each have 4096 256-byte cache lines for a total storage capacity of 1 MB, at a latency of approximately 40-60 cycles. Finally, each system memory 122a-122c can store tens or hundreds of megabytes of data at an even longer latency, for example, 300-400 cycles. Given the large disparity in access latencies between the various levels of the memory hierarchy, it is advantageous to reduce accesses to lower levels of the memory hierarchy and, in particular, to system memories 122a-122c.

System interconnect 112, which can comprise one or more buses or a cross-point switch, serves as a conduit for communicating transactions between processing units 110a-110c and other snoopers (e.g., L3 caches 120a-120c) coupled to system interconnect 112. A typical transaction on system interconnect 112 begins with a request, which may include a transaction field indicating the type of transaction, source and destination tags indicating the source and intended recipient (s) of the transaction, respectively, and an address and/or data. Each device connected to system interconnect 112 preferably snoops all transactions on system interconnect 112 and, if appropriate, responds to the request with a snoop response. Such snoop responses are received and compiled by response logic 124, which provides a combined response indicating what action, if any, each snooper is to take in response to the request. These actions may include sourcing data on system interconnect 112, storing data provided by the requesting snooper, etc.

Those skilled in the art will appreciate that data processing system 100 can include many additional components, such as bridges to additional interconnects, I/O devices, non-volatile storage, and ports for connection to networks or attached devices, etc. Because such additional components are not necessary for an understanding of the present invention, they are not illustrated in FIG. 1 or discussed further herein.

Figure 2:
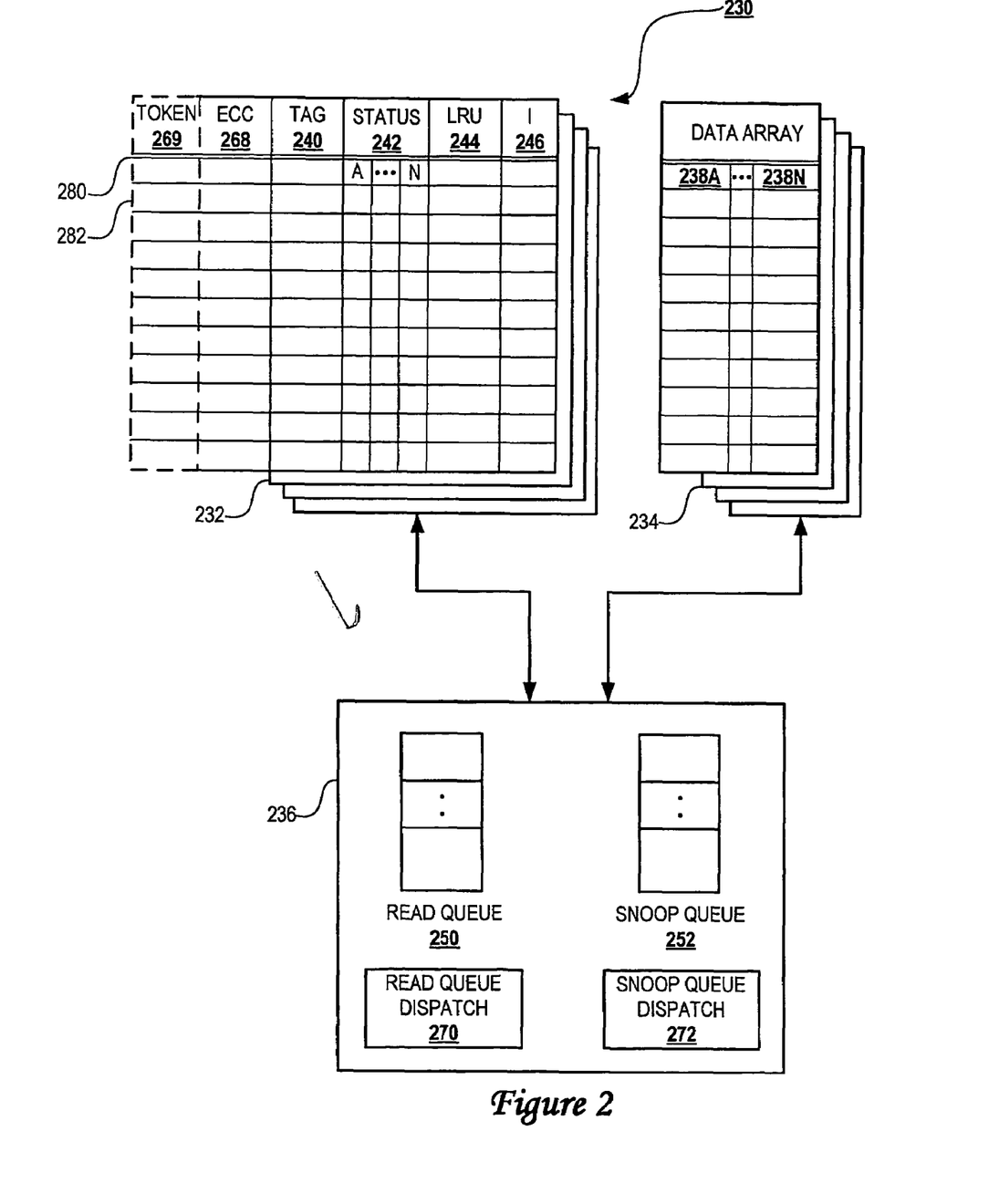
FIG. 2 is a high level block diagram of a sectored cache in accordance with the present invention.

With reference now to FIG. 2, there is depicted a more detailed block diagram of an illustrative embodiment of a cache 230 that may be utilized to implement any of L1 caches 116a, 116b and 116c, L2 caches 118a, 118b and 118c, and L3 caches 120a, 120b and 120c, in accordance with the present invention. In the illustrative embodiment, cache 230 is a four-way set associative cache including a directory array 232, a data array 234, and a cache controller 236. Accordingly, data array 234 of cache 230 comprises a number of congruence classes (or sets) that each contain four ways for storing cache lines. As in conventional set associative caches, memory locations in system memories 222a, 222b and 222c, are mapped to particular congruence classes (or sets) within data array 234 utilizing predetermined index bits within the system memory address.

As further shown in FIG. 2, each cache line, such as first cache line 280 and second cache line 282 within data array 234 is sectored into one or more sectors 238a-238n that can be individually accessed and modified. Although not required by the present invention, it is convenient if the sector size utilized by each cache is the same as the cache line size of the associated higher level cache, if any. For example, if L1 caches 116a, 116b and 116c have 64-byte cache lines, L2 caches 118a, 116b and 116c and L3 caches 120a, 120b and 120c preferably implement 256-byte (four 64-byte sectors) and 512-byte (four 128-byte sectors) cache lines, respectively.

The cache lines stored within data array 234 are recorded in cache directory array 232, which contains one directory entry for each cache block in data array 234. Each directory entry comprises a tag field 240, one or more status fields 242a-242n, a least recently used (LRU) field 244, an inclusion field 246, and an ECC field 268. Tag field 240 specifies which cache line is stored in the corresponding block of data array 234 by storing the tag bits of the system memory address of the cache line. Status field 242 separately indicates the coherency and/or consistency status of each sector of the cache line stored in the corresponding block of data array 234 utilizing predefined bit combinations. LRU field 244 indicates how recently the corresponding block of data array 234 has been accessed relative to the other blocks within its congruence class, thereby indicating which cache line should be evicted from the congruence class in case of a cache miss. Token field 269 holds token data as described below with respect to FIG. 3.

Inclusion field 246 indicates whether or not each sector of the cache line stored in the corresponding way of data array 234 is also stored in the local memory unit (i.e., cache or system memory) at the next lowest level of the memory hierarchy. Finally, ECC field 268 provides check bits to correct and/or detect soft bit errors within the cache directory entry. It should be noted that an update to any field or subfield within the directory entry requires the re-computation of the ECC field value based on the new values of all the fields in the directory entry.

Still referring to FIG. 2, cache controller 236 manages storage and retrieval of data within data array 234 and updates to cache directory 232 in response to signals received from the associated components of the memory hierarchy and transactions snooped on system interconnect 112a, 112b and 112c. As illustrated, cache controller 236 maintains a read queue 250 and a snoop queue 252 from which cache controller 236 performs updates to cache directory 232 and accesses to data array 234.

In response to a received operation, a snoop or read queue typically performs a number of subtasks, only one of which is updating, if necessary, cache directory array 232. These subtasks can include invalidating higher level cache directories, reading cache data from cache data array 234, and intervening, delivering, or pushing cache data, among others. Certain higher level dependencies often require that these subtasks, including the directory array update, be performed in a certain order with some subtasks not overlapping one another.

Figure 3:
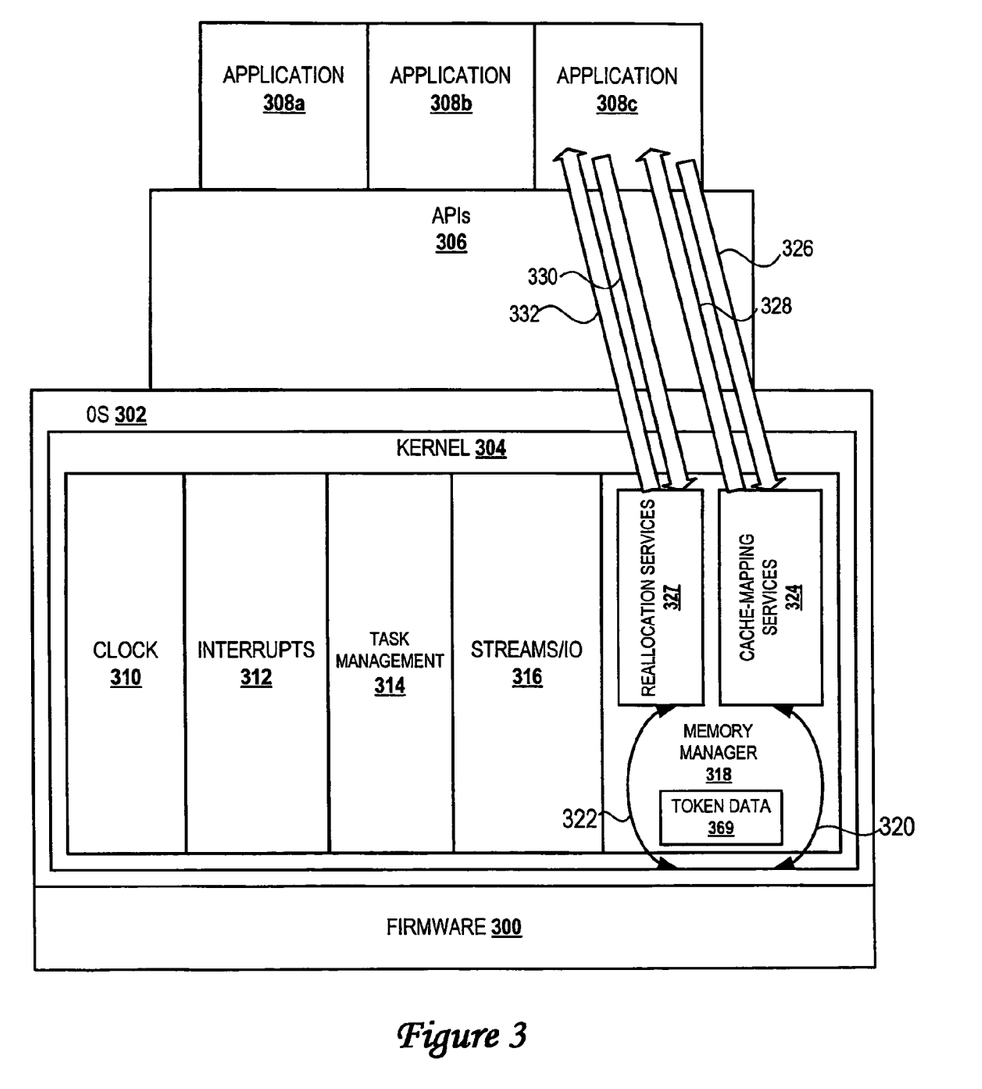
FIG. 3 is a software layer diagram illustrating kernel services in accordance with one embodiment of the present invention.

Turning now to FIG. 3, a block diagram representation of a set of data processing operations interacting in accordance with one embodiment of the present invention is depicted. As shown in FIG. 3, the software configuration includes firmware 300, which interacts with the underlying hardware of data processing system 100. The software configuration further includes an operating system 302, a set of application program interfaces (APIs) 306 and applications 308a-308c.

Within operating system 302, a kernel 304 provides a set of kernel services 310-318. The first of these kernel services is a clock service 310 providing an internal clock. An interrupt kernel service 312 services interrupts. A task management kernel service 314 balances resources between tasks. A streams and I/O kernel service 316 provides interaction with I/O units. Memory manager 318 allocates memory resources, such as distributed system memories 122a-122c, L2 caches 118a-118c and L3 caches 120a-120c to various tasks. One skilled in the art will quickly realize that other kernel services, not shown, may also be included.

Memory manager 318 interacts with firmware 300 through defined interfaces, such as messages 320 and 322. Among the functions of memory manager 318 is a set of cache mapping services 324. Memory manager 318 provides services necessary to translate virtual addresses, used by applications 308a-308c to physical addresses used by distributed system memories 122a-122c, L2 caches 118a-118c and L3 caches 120a-120c. The conversion between physical and virtual addresses is called address translation. Pinning memory is the construct of fixing the association between a virtual address and a physical address for translation purposes. Memory manager 318 uses token data 369 to provide cache-mapping services indicates the token range for a given directory entry. Each cache congruence class set will typically be assigned a unique token value. The token value will be within a range of 0 to 'n' where 'n' corresponds to the highest token value. The highest token value is a product of the last congruence class set. For example, in a cache with 2048 congruence class sets, where each congruence class contains 16 cache lines, the token values may range from 0 to 32,767. The maximum token value is implementation dependent, and could range to 2048 in an embodiment where there are 2048 congruence classes and no token assignment difference on the basis of cache lines. The token value could also range from 0 to 131,071 in an embodiment where there are 2048 congruence classes and a different token value for each cache sector. The present invention is adaptable to any method by which the cache is divided or partitioned, because it assigns unique tokens to each significant division within the cache. Memory manager 318 also provides reallocation services 327.

The present invention provides for an application 308c to receive a cache map by sending a cache map request 326 to cache mapping services 324 within memory manager 318 of kernel 304. Cache mapping services 324 within memory manager 318 then send messages 320 to firmware 300 and receive messages 320 detailing the mapping of cache memory, as is well known in the art. Cache mapping services 324 within memory manager 318 of kernel 304 then sends a cache map 328 to application 308c.

Likewise, the present invention allows application 308c to send a reallocation request 330 to reallocation services 327 on memory manager 318 of kernel 304. Reallocation services 327 can then send messages 322 to firmware 300, reallocating virtual addresses to different parts of the physical RAM, and can respond to application 308c by sending a reallocation response 332 to application 308c.

Figure 4:
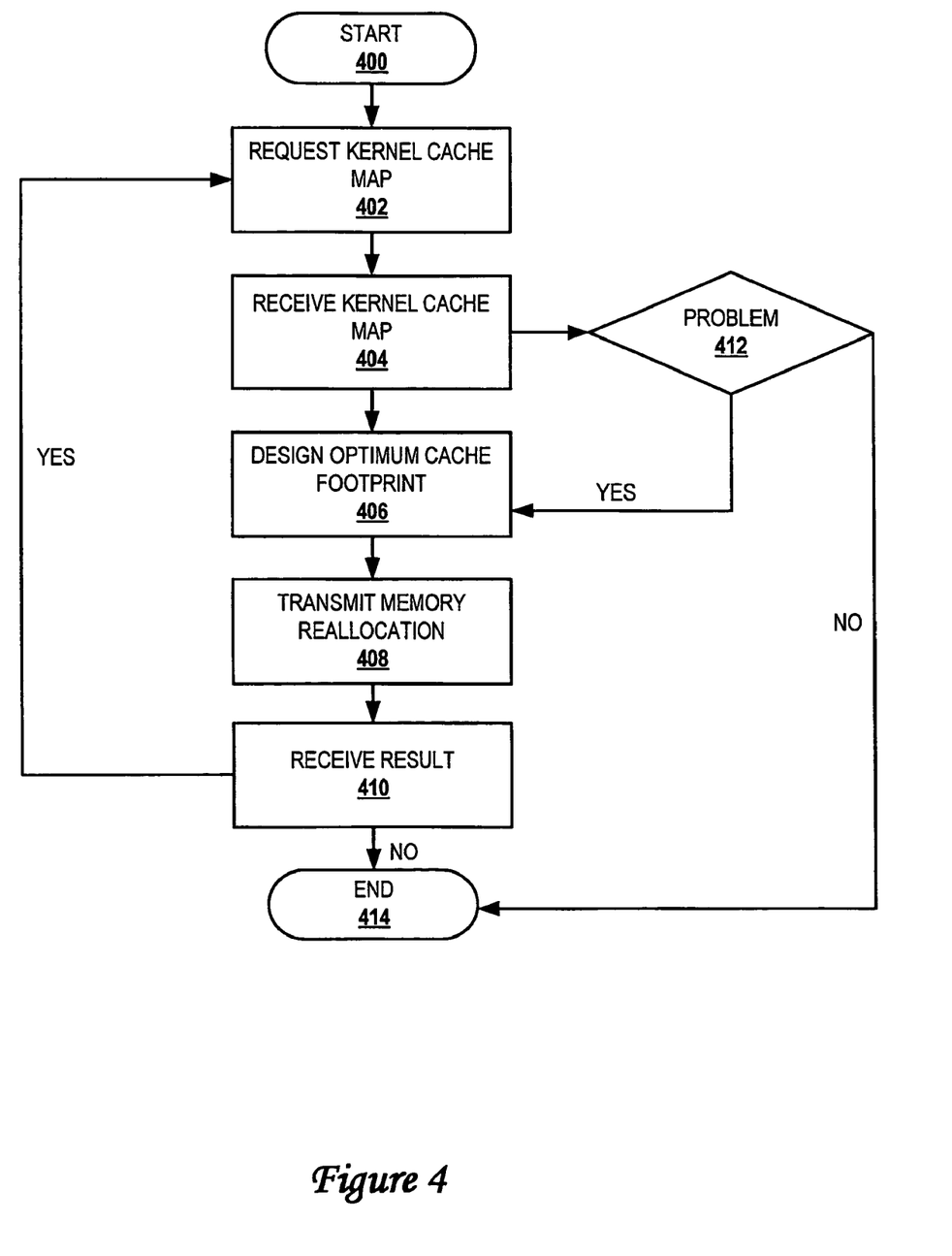
FIG. 4 is a high-level logical flowchart of a process for request and receipt of a kernel-generated cache map and design of a cache reallocation scheme in accordance with a preferred embodiment of the present invention.

With reference now to FIG. 4, a high-level logical flowchart of a process on an application for request and receipt of a kernel generated cache map and design of a cache reallocation scheme in accordance with a preferred embodiment of the present invention is depicted. The process starts at step 400. The process next moves to step 402, which depicts an application 308c requesting a cache map by sending a cache map request 326 to cache mapping services 324 of memory manager 318 of kernel 304. The process then proceeds to step 404. Step 404 depicts application 308c receiving a cache map 328 from cache mapping services 324 on memory manager 318 of kernel 304. An application 308c is free to request any cache description for any pages allocated at any time. Such a cache description will include token field 369 values associated with the appropriate cache line.

The process then moves to step 412. At step 412, application 308c determines whether any problem exists in the current cache mapping for application 308c that requires the design of a new cache map. If so, the process moves to step 406, which is described below. If the current cache map is acceptable, then the process ends at step 414.

The process then proceeds to step 406, which depicts application 308c designing an optimum cache footprint. In the present invention, an application can use cache token values to evaluate a range of or all of the allocated pinned memory for its objects and decide if an appropriate cache distribution has been allocated. The method by which an application would decide if an appropriate cache distribution has been allocated is application-dependent. Some applications will need an allocation scheme where all cache tokens in the applicable range are used. Others will want an allocation wherein the statistical distribution of the tokens follows a given pattern. Optimization of the reallocation routine could include a list of recently reallocated pages that are not candidate pages. The listing could occur at the thread, process, or system scope. One example of an optimized cache footprint is represented by concentrating data within a single congruence class or a limited set of congruence classes, such as first cache line 280 and second cache line 282. Such an example would prove appropriate where an application delivers temporally disjoint data streams, and the data streams would occupy the same congruence class and be supported by the same token 269. Conversely, data sets from other applications, such as those performing matrix transformations, may be distributed (to maximize the likelihood of high cache access availability and efficiency) across multiple congruence classes. As is well known in the art, multiple consecutive accesses to data in the same congruence class are less efficiently serviced by many cache designs.

The process next proceeds to step 408. At step 408, application 308c transmits a memory reallocation request 330 to reallocation services 327 of memory manager 318 of kernel 304. Individual applications will tailor the decision as to when allocation is suitable and the number of acceptable attempts to reallocate pages. An application will eventually receive an acceptable cache mapping or abandon the attempt to reallocate. Reallocation services 327 of memory manager 318 of kernel 304 then sends a message 322 to firmware 300 reallocating memory and response to reallocation request.

The process next moves to step 410, which depicts application 308c receiving reallocation request response 332 from reallocation services 327, of memory manager 318 of kernel 304. The process then returns to step 402, which is described above.

Figure 5:
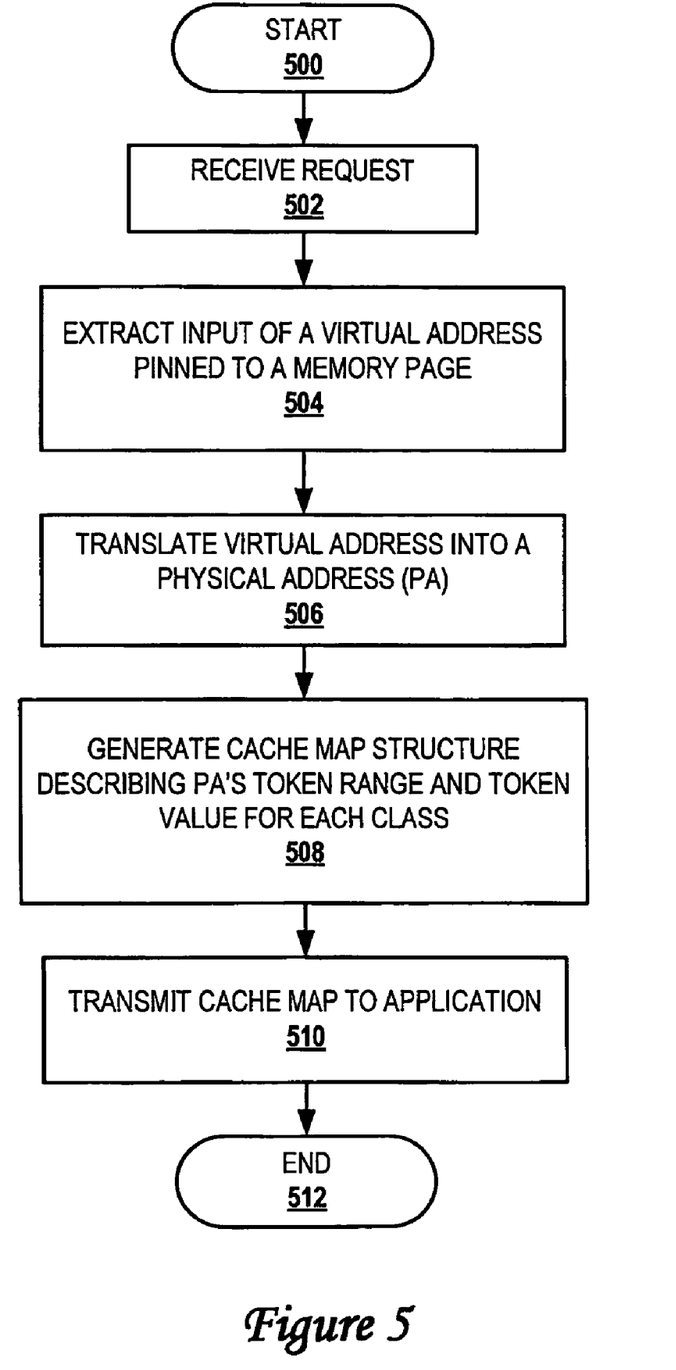
FIG. 5 is a high-level logical flowchart of a process for a kernel service creating and transmitting to an application a cache map according to one embodiment of the present invention.

Turning now to FIG. 5, a high level logical flow chart of a process for a kernel service creating and transmitting to an application a cache map according to one embodiment of the present invention is illustrated. The process starts at step 500. The process then moves to step 502, which depicts cache mapping services 324 on memory manager 318 of kernel 304 receiving cache map request 326 from application 308c. The process next proceeds to step 504. At step 504, cache mapping services 324 of memory manager 318 of kernel 304 extract from cache map request 326 a virtual pointer. The process next proceeds to step 506, which depicts cache mapping services 324 translating the virtual pointer extracted in step 504 into a physical address.

The process then moves to step 508, at which cache mapping services 324 of memory manager 318 of kernel 304 generate a cache map structure describing the physical address token range from token field 269 in directory array 232 of cache 230. Cache mapping services 324 then generates a cache map structure through interaction with firmware 300 using messages 320. The process then moves to step 510, which depicts cache mapping service 324 on memory manager 318 of kernel 304 transmitting a cache map 328 to the requesting application 308c. The process then ends at step 512.

Figure 6:
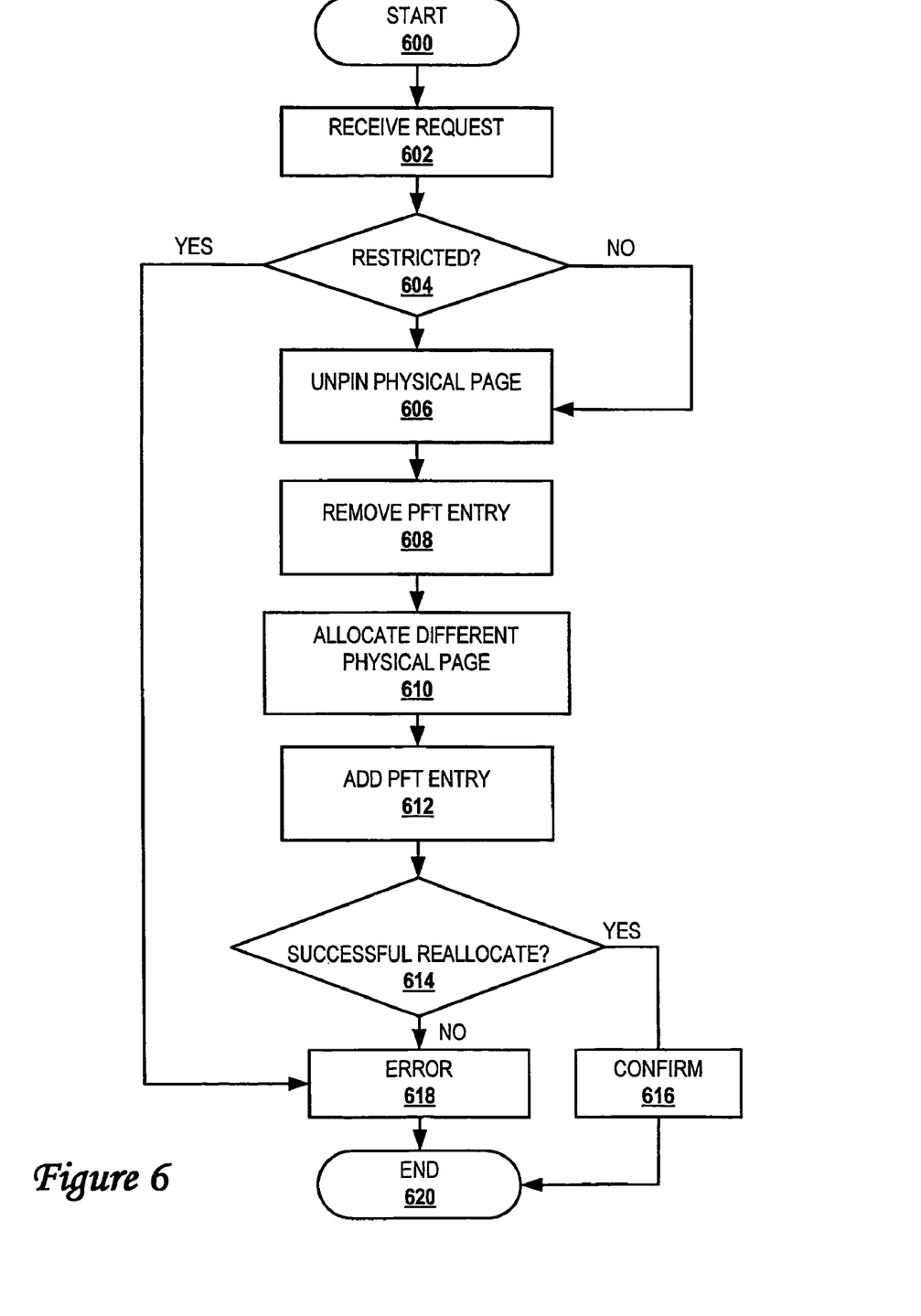
FIG. 6 is a high-level logical flowchart of a process for a kernel service reallocating cache resources in response to a request from an application according to one embodiment of the present invention.

With reference now to FIG. 6, a high level logical flow chart of a process for a kernel service reallocating cache resources in response to a request from an application according to one embodiment of the present invention is depicted. The process starts at step 600 and then moves to step 602. At step 602, reallocation services 327 of memory manager 318 of kernel 304 receives a cache reallocation request 330 from application 308c.

The process next moves to step 604, which depicts reallocation services 327 of memory manager 318 of kernel 304 determining whether cache reallocation request 330 requests access to restricted resources, such as a restricted address range. An application is free to reallocate any unrestricted page irrespective of whether the page has previously been reallocated. If reallocation services 327 on memory manager 318 of kernel 304 determines that a cache reallocation request 330 from application 308c requests access to restricted resources, then the process proceeds to step 618, which depicts reallocation services 327 sending a reallocation request response 332 containing an error message to application 308c. The process then ends at step 620.

Returning to step 604, if reallocation services 327 on memory manager 318 of kernel 304 determines that the reallocation request 330 sent by application 308c does not request restricted resources, then the process proceeds to step 606. Step 606 depicts reallocation services 327 unpinning a physical page within memory manager 318. The process then moves to step 608, which depicts memory manager 318 removing the page frame table entry affecting the reallocated RAM from page frame table 126a-126c. The process next proceeds to step 610, which depicts reallocation services 327 on memory manager 318 of kernel 304 allocating a different physical page to the page represented by reallocation request 306. Reallocation of a physical page leaves a virtual address in place, and does not change the semantics of the application objects' access to page objects. Thus, a multi-page object which has contiguous pages from the application's point of view will continue to have contiguous pages. Allocating a different physical page will necessitate update of the translation look-aside buffers 128a-128c. The process then moves to step 612, which depicts reallocation services 320 on memory manager 318 of kernel 304 adding a new page frame table entry to page frame tables 126a-126c reflecting the reallocation indicated in reallocation request 330.

The process next moves to step 614, which depicts reallocation services 320 and memory manager 318 of kernel 304 determining whether the reallocation requested in reallocation request 330 was successfully executed. If the reallocation request contained in reallocation request 330 was successfully executed by reallocation services 320 on memory manager 318 of kernel 304, then the process proceeds to step 616, which illustrates sending to application 308c a reallocation request response to 332 containing confirmation that the reallocation request 330 was successfully executed. The process then ends at step 620. If the reallocation request 330 was not successfully executed, then the process moves to step 618, which is described above.

The present invention provides a method for a kernel service to provide information to an application about caching properties for a particular memory resource. The present invention allows an application to use information provided by the kernel service to optimize its cache footprint for the lifetime of the application. The anticipated use of this kernel service would be long running computation workloads that can afford the higher cost to improve an optimized cache layout. These applications can be very sensitive to cache efficiency, and, in the case of a scientific workload, throughput is paced by the longest latency. By optimizing cache footprint, the present invention allows the long-running applications to improve their performance.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system, which includes a cache memory, said method comprising:
   an operating system receiving from an application a request for a kernel cache map;
   said operating system sending said kernel cache map to said application;
   said operating system receiving an optimum cache footprint for a data set from said application, wherein said optimum cache footprint specifies a physical arrangement of said data set from said application within said cache memory;
   said operating system receiving a memory reallocation order from said application; and
   said operating system executing said memory reallocation order to reorganize said data set in memory in accordance with said optimum cache footprint.

2. The method of claim 1, wherein said step of receiving a memory reallocation order from said application further comprises receiving a memory reallocation order containing said optimum cache footprint from said application.

3. The method of claim 1, wherein said step of receiving a memory reallocation order from said application further comprises receiving said memory reallocation order in a reallocation services tool within a memory manager.

4. The method of claim 1, further comprising sending a result to said application confirming whether said memory manager executed said reallocation order.

5. The method of claim 1, wherein said optimum cache footprint for a data set comprises an indication of an arrangement in which data belonging to said data set is distributed across multiple cache lines.

6. The method of claim 1, wherein said optimum cache footprint for a data set comprises a cache footprint for matrix manipulations.

7. The method of claim 1, wherein said optimum cache footprint for a data set comprises an indication of multiple data elements from said data set that are to be aggregated within a single congruence class.

8. The method of claim 1, wherein said optimum cache footprint further comprises a designated token value.

9. A data processing system, said system comprising:
   a cache memory;
   a processor; and
   data storage coupled to the processor and including an operating system executable by the processor, wherein the operating system, responsive to receiving a request from an application for a kernel cache map sends said kernel cache map to said application;
   wherein said operating system, responsive to receiving from said application an optimum cache footprint for a data set and a memory reallocation order, said optimum cache footprint specifying a physical arrangement of said data set from said application within said cache memory, executes said memory reallocation order to reorganize said data set in memory in accordance with said optimum cache footprint.

10. The system of claim 9, said memory reallocation order containing said optimum cache footprint from said application.

11. The system of claim 9, wherein said operating system receives said memory reallocation order in a reallocation services tool within a memory manager.

12. The system of claim 9, wherein said operating system sends a result to said application confirming whether a memory manager executed said reallocation order.

13. The system of claim 9, wherein said optimum cache footprint for a data set further comprises an indication of an arrangement in which data belonging to said data set is distributed across multiple cache lines.

14. The system of claim 9, wherein said optimum cache footprint for a data set comprises a cache footprint for matrix manipulations.

15. The system of claim 9, wherein said optimum cache footprint for a data set comprises an indication of multiple data elements from said data set that are to be aggregated within a single congruence class.

16. The system of claim 9, wherein said optimal cache footprint further comprises a designated token value.

17. A computer usable storage medium embodying computer program code, said computer program code comprising computer-executable instructions configured for:
   an operating system receiving from an application a request for a kernel cache map;
   said operating system sending said kernel cache map to said application;
   said operating system receiving an optimum cache footprint for a data set from said application, wherein said optimum cache footprint specifies a physical arrangement of said data set from said application within a cache memory;
   said operating system receiving a memory reallocation order from said application; and
   said operating system executing said memory reallocation order to reorganize said data set in memory in accordance with said optimum cache footprint.

18. The computer usable storage medium in claim 17, wherein said receiving a memory reallocation order from said application further comprises computer executable instructions configured for:
   said operating system receiving said memory reallocation order containing said optimum cache footprint from said application.

* * * * *